No. 827,912. PATENTED AUG. 7, 1906.
G. HUDSON.
APPARATUS FOR CONVEYING AND DISINTEGRATING THE FLOUR FLAKES
PRODUCED BY THE SMOOTH ROLLS IN FLOUR MILLING
AND FOR KINDRED PURPOSES.
APPLICATION FILED AUG. 27, 1903.
4 SHEETS—SHEET 1.
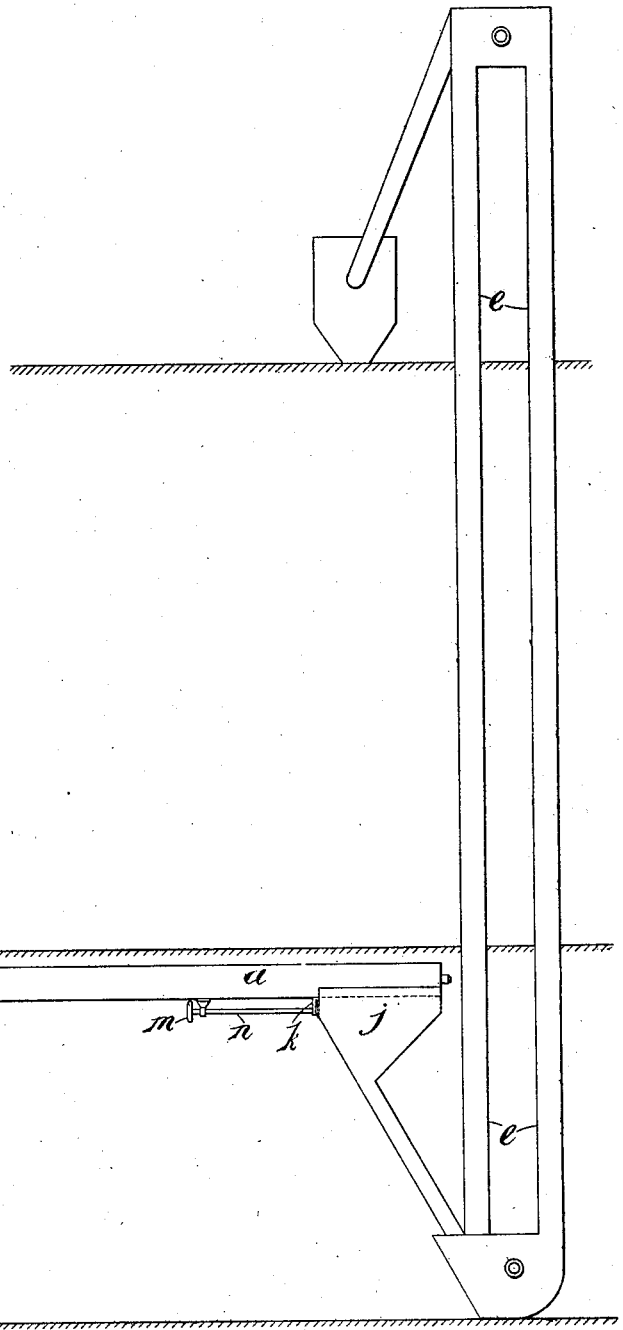

No. 827,912. PATENTED AUG. 7, 1906.
G. HUDSON.
APPARATUS FOR CONVEYING AND DISINTEGRATING THE FLOUR FLAKES
PRODUCED BY THE SMOOTH ROLLS IN FLOUR MILLING
AND FOR KINDRED PURPOSES.
APPLICATION FILED AUG. 27, 1903.
4 SHEETS—SHEET 2.
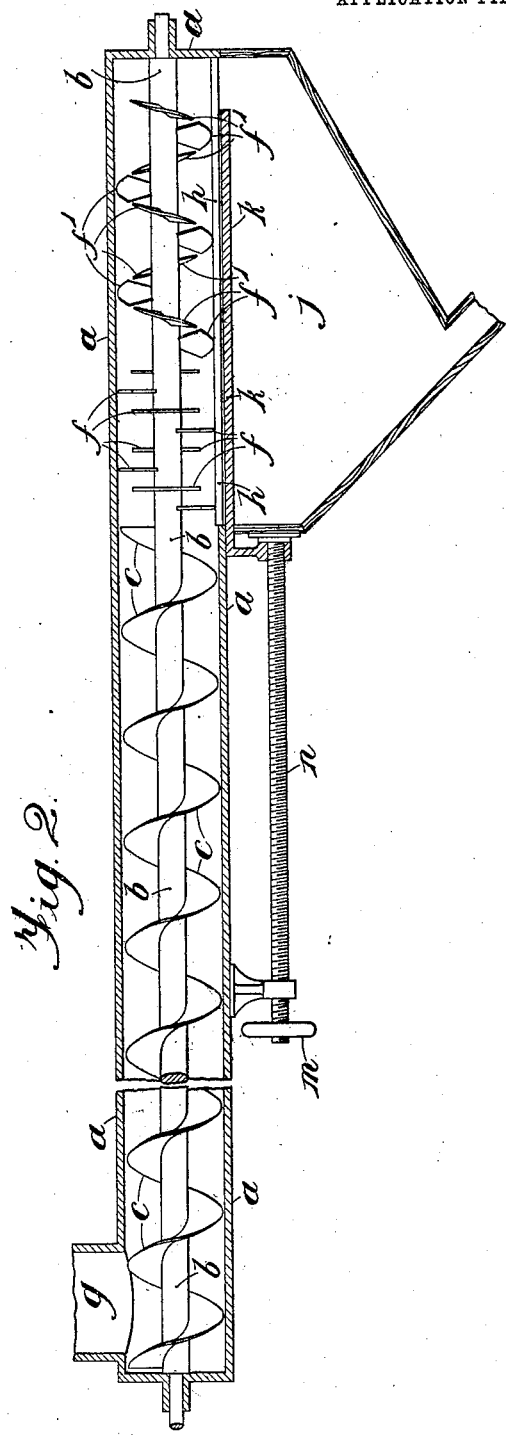
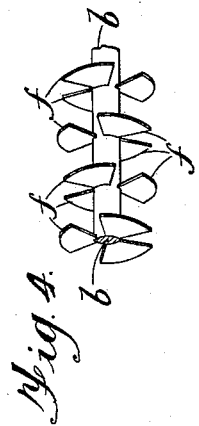
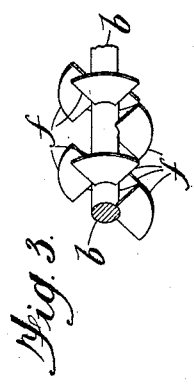
INVENTOR:
George Hudson
By his Attorneys
WITNESSES:

No. 827,912. PATENTED AUG. 7, 1906.
G. HUDSON.
APPARATUS FOR CONVEYING AND DISINTEGRATING THE FLOUR FLAKES
PRODUCED BY THE SMOOTH ROLLS IN FLOUR MILLING
AND FOR KINDRED PURPOSES.
APPLICATION FILED AUG. 27, 1903.
4 SHEETS—SHEET 3.
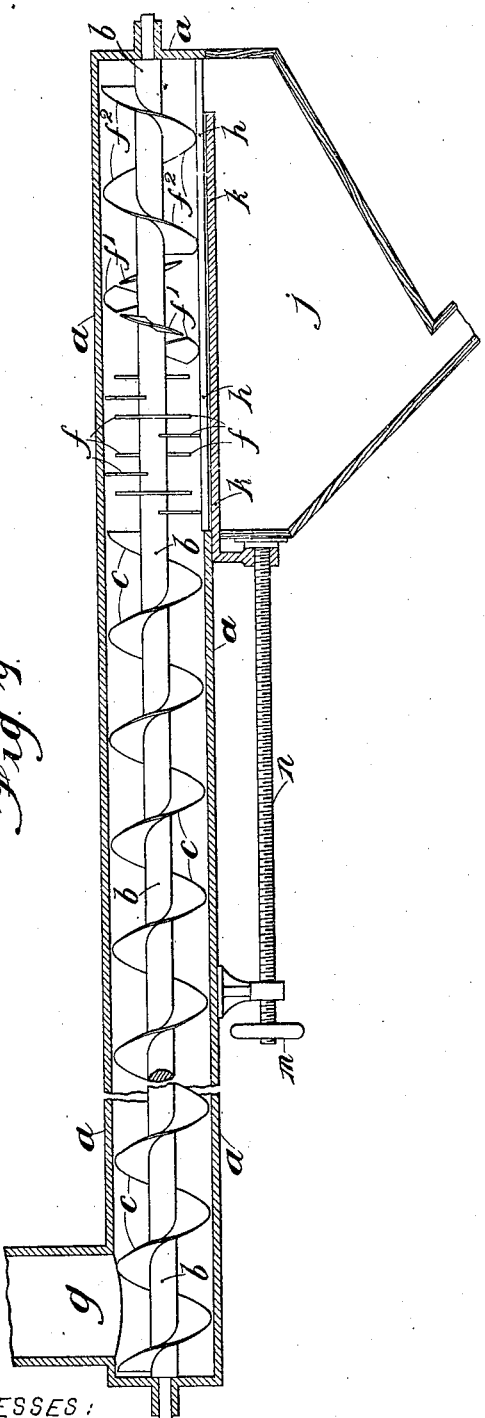
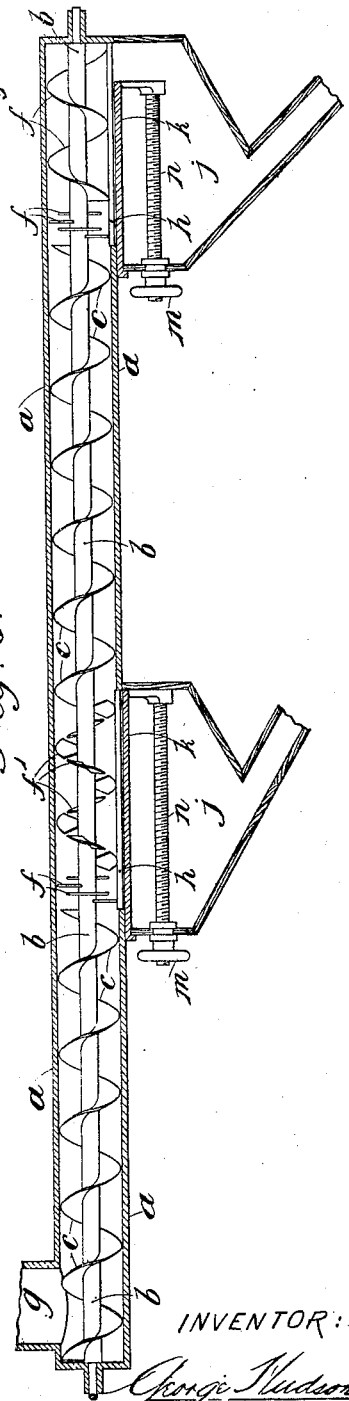
WITNESSES:
INVENTOR:

No. 827,912. PATENTED AUG. 7, 1906.
G. HUDSON.
APPARATUS FOR CONVEYING AND DISINTEGRATING THE FLOUR FLAKES
PRODUCED BY THE SMOOTH ROLLS IN FLOUR MILLING
AND FOR KINDRED PURPOSES.
APPLICATION FILED AUG. 27, 1903.
4 SHEETS—SHEET 4.
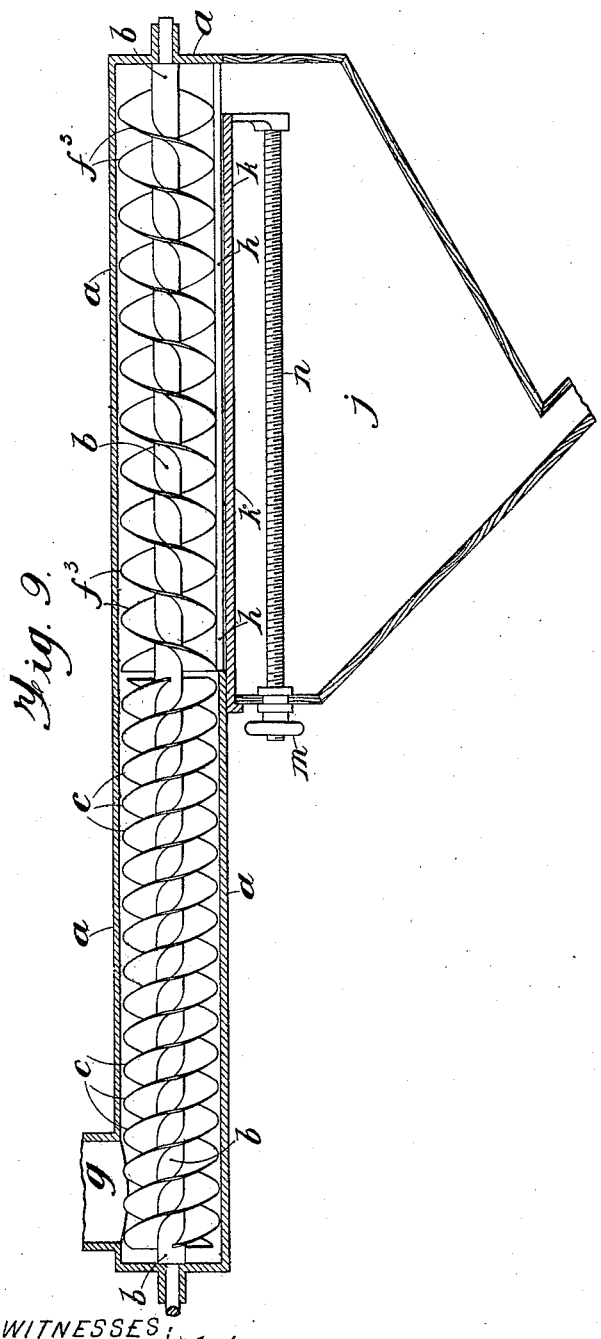
WITNESSES:
Thomas T. Wallace
René Bruine
INVENTOR:
George Hudson,
By his Attorneys,
Arthur E. Fraser & Co.
THE NORRIS PETERS CO., WASHINGTON, D. C.

UNITED STATES PATENT OFFICE.

GEORGE HUDSON, OF SUNDERLAND, ENGLAND.

APPARATUS FOR CONVEYING AND DISINTEGRATING THE FLOUR FLAKES PRODUCED BY THE SMOOTH ROLLS IN FLOUR-MILLING AND FOR KINDRED PURPOSES.

No. 827,912.  Specification of Letters Patent.  Patented Aug. 7, 1906.

Application filed August 27, 1903. Serial No. 170,937.

*To all whom it may concern:*

Be it known that I, GEORGE HUDSON, a subject of the King of Great Britain and Ireland, residing at and whose post-office address is Tunstall Park, Sunderland, in the county of Durham, England, have invented certain new and useful Improvements in Apparatus for Conveying and Disintegrating the Flour Flakes Produced by the Smooth Rolls in Flour-Milling and for Kindred Purposes, of which the following is a specification.

This invention relates to apparatus for conveying and disintegrating the flour flakes produced by the smooth rolls in flour-milling and for kindred purposes.

In modern flour-milling the best grades of flour are produced by passing the wheat semolina through smooth rolls running at slightly-different speeds, which naturally causes the material (hereinafter referred to as the "meal") to flake, and before the flour can be separated these flakes must be broken up. The wheat semolinas, however, are never absolutely pure, as they always contain particles of bran, germ, and like impurities, which it is not desirable to have in the finished flour, and care, therefore, must be taken while breaking up the flour flakes not to grind up any of the said impurities, or the resultant flour will be much discolored, and consequently reduced in quality and value. Again, some classes of meal require more pressure under reduction than others. A machine to be successfully used for the purpose of breaking up the flour flakes must therefore be capable of the most delicate adjustment and have a considerable range of disintegration; but most of the machines hitherto used have only very defective adjustment or have no adjustment at all or have a grinding action. Consequently as a rule they are not applied to meal that contains a great quantity of impurities, but only to the purest stock.

The object of my invention is to provide a machine that shall be applicable to all smooth-roll reductions and in which the "detaching" or breaking up of the flour flakes may be effected in the same machine or apparatus as that in which the conveyance of the meal from the smooth rolls to the elevator or next machine takes place instead of these two processes being carried out in separate machines, as has hitherto been customary.

In carrying my improvements into effect I combine with a conveyer of the screw-blade or equivalent type a back-pressure or retarding device or devices which is or are disposed or arranged so as to obstruct the passage or interfere with the free flow of the meal through the conveyer, and thus effect the detaching or breaking up of the flour flakes. Such a retarding or back-pressure device or devices may be contained in the conveyer itself or may be disposed at or about its exit or otherwise suitably, and in order that the degree of disintegration may be most delicately adjusted I combine with the retarding or back-pressure device or devices a suitable opening or openings and a slide or slides by means of which the amount of back-pressure or retarding effect may be varied. Hence a machine made in accordance with my invention, owing to its rigid and at the same time delicate adjustment and peculiar action, can be used on any class of meal that is considered pure enough to go through a smooth roll without discoloring the resultant flour.

In order that my invention may be thoroughly understood and carried into practice, I will now proceed to describe several forms of it with reference to the accompanying drawings, wherein—

Figure 1 is an elevation showing the general arrangement of my improved apparatus. Fig. 1ª is a plan of the rolls. Fig. 2 is a central longitudinal section, and Figs. 3, 4, 5, and 6 are views of details of one form of my invention, and Figs. 7, 8, and 9 are central longitudinal sections of other forms of it.

Referring to Figs. 1, 2, 3, 4, 5, and 6, I employ a drum or casing $a$, fitted with a revoluble shaft $b$, having a conveyer blade or blades $c\ c$ disposed thereon to convey the meal from the smooth rolls $d$ to the elevator $e$. At the end of the shaft $b$ nearest the elevator or, if desired, on an extension thereof I dispose blades, arms, beaters, or the like arranged at a reverse angle to the conveyer blade or blades $c\ c$ or at a different angle thereto or parallel to or at right angles to the shaft $b$ or otherwise conveniently so that they impart a retarding effect or back pressure on the meal. The arrangement of blades illustrated consists of a continuous right-hand or conveyer blade $c$, straight or rubbing blades $ff$—that is to say, blades disposed in a plane at right angles to the shaft $b$—and broken or interrupted left-hand retarding or back-pressure blades $f'f'$, though, of course, if desired, the straight retarding-blades $ff$ may be omitted and replaced by back-pressure blades $f'f'$. The blades $ff$ may be stepped round the shaft $b$, as shown in Fig. 3, or arranged in groups thereround, as shown in Fig. 4. In the bottom of the drum or casing $a$ and immediately below the rubbing and retarding or back-pressure blades or the like $ff$ and $f'f'$ and extending the entire length thereof is an outlet $h$ into a hopper $j$, leading to the elevator $e$. The outlet $h$ is adapted to be covered and uncovered by a movable slide or door $k$ of such dimensions that when the latter is in the position shown in Fig. 2 there is preferably a small opening of, say, about six inches between the end of the slide and the end of the casing $a$ in order that the meal may always have a perfectly free discharge over the end of the slide $k$, as the more freely the meal leaves the machine the more rapidly is the flour separated in the succeeding operations. It will be evident that any meal which enters the casing $a$ at $g$ will be rapidly carried forward by the conveyer-blade $c$ until it comes under the influence of the rubbing and retarding or back-pressure blades or the like $ff$ and $f'f'$, which will tend to retard or reverse its flow; but, however, as the conveying-blade $c$ is more powerful than the blades or the like $ff$ and $f'f'$ the material is forced through or between the latter and the breaking up or detaching of the flour flakes takes place, but without any grinding up of the impurities occurring. The right-hand or conveyer blade $c$ and the left-hand retarding or back-pressure blades $f'f'$ each tends to force the meal against the straight rubbing-blades $ff$, which being arranged at right angles to the shaft do not produce any direct back or forward pressure on the meal themselves, but "rub" the meal with both of their sides, and thus the maximum "rubbing" or detaching effect is obtained with the minimum resistance, and to still further increase the rubbing action of the blades $ff$ they may be made more or less V-shaped in section, as shown in Figs. 5 and 6. The slide $k$, which may be moved or actuated by the hand-wheel $m$ and screwed rod $n$ or otherwise conveniently by its position regulates the number of rubbing and retarding or back-pressure blades or the like $ff$ and $f'f'$ brought into action, and consequently the amount of back pressure or retarding effect imparted to the meal. In the position illustrated the maximum retarding effect is obtained; but by moving the slide $k$ outwardly or to the left and uncovering a greater portion of the outlet $h$, and so reducing the number of rubbing and retarding or back-pressure blades or the like $ff$ and $f'f'$ brought into action, the meal can be subjected to less and less until eventually the minimum retarding effect or back pressure.

In practice I find that the meal runs off the end of the slide $k$ at a very slight angle, owing to it being so freely agitated by the blades or the like $ff$ and $f'f'$. This somewhat reduces the disintegrating effect of the apparatus, and to overcome it I sometimes arrange, as shown in Fig. 7, a section of continuous left-hand retarding blade or blades $f^2$ at the end of or instead of a portion of the broken or interrupted left-hand retarding-blades $f'f'$, which has the effect of imparting a greater back pressure to the meal.

The slide $k$ may be arranged in any other suitable position than that shown and it may have an extent of travel which will permit the meal to leave the casing $a$ without being acted on at all by the rubbing and retarding or back-pressure blades or the like $ff$, $f'f'$, and $f^2$ should it be desired at any time to use the apparatus simply as a conveyer. Again, instead of the rubbing and retarding or back-pressure blades or the like being only arranged at one end of the apparatus, as illustrated in Figs. 2 and 7, they may, as shown in Fig. 8, alternate in the length thereof with sections or portions of conveyer-blades $c$, and each such combination of conveyer and rubbing and retarding or back-pressure blades may be provided with an outlet $h$, an adjustable slide $k$, and hopper $j$, all of which will, of course, be connected to a common discharge-spout.

Although I have described and illustrated the conveying device as being a continuous blade, it may be constituted by broken or interrupted blades or a combination of continuous and broken blades, and instead of the retarding device being composed of broken blades $f'f'$ or a combination of broken and continuous blades $f'f'$ and $f^2$ it may be one continuous blade $f^3$, as shown in the right-hand portion of Fig. 8. Moreover, the conveying and retarding blades need not be single-threaded, but screws of two or more threads may be mounted on the same shaft or part thereof. Thus, as illustrated in Fig. 9, by making the conveyer-section of blades $cc$ triple-threaded and the retarding or back-pressure section of blades $f^3f^3$ or $f'f'$ or $f'f'$ and $f^2$ double-threaded both sections of blades may be of the same length and a much shorter machine obtained. I prefer a short machine, as it can be run at a much higher speed than it would be safe to run a long machine.

If desired, straight rubbing-blades $ff$ may be combined with the arrangement illustrated in Fig. 9.

What I claim as my invention, and desire to secure by Letters Patent, is—

1. In milling appartaus for producing flour from grain and separating the germ, the combination of, a casing, means for forming the meal (including germ and flour) into flakes, and feeding them into the casing, and means for detaching the flour from the germ without breaking up the latter comprising a shaft, a conveying-blade disposed thereon in the form of a helix, a second blade disposed on the shaft but at a different angle to the aforesaid blade, and means for rotating the shaft, substantially as and for the purpose set forth.

2. In milling apparatus for producing flour from grain and separating the germ, the combination of, a casing, means for forming the meal (including germ and flour) into flakes, and feeding them into the casing, and means for detaching the flour from the germ without breaking up the latter comprising a shaft, a conveying-blade disposed thereon in the form of a helix, a second blade disposed on the shaft but at a different angle to the aforesaid blade, and means for rotating the shaft, and an adjustable slide by means of which the number of blades brought into operation can be regulated and the degree of detaching the component parts of the flour flakes varied, substantially as and for the purpose set forth.

3. In milling apparatus for producing flour from grain and separating the germ, the combination of, a casing, means for forming the meal (including germ and flour) into flakes, and feeding them into the casing, and means for detaching the flour from the germ without breaking up the latter comprising a shaft, a conveying-blade disposed thereon in the form of a helix, means for rotating the shaft and a second blade disposed on the shaft at right angles to the axis thereof, substantially as and for the purpose set forth.

4. In milling apparatus for producing flour from grain and separating the germ, the combination of, a casing, means for forming the meal (including germ and flour) into flakes, and feeding them into the casing, and means for detaching the flour from the germ without breaking up the latter comprising a shaft, a conveying-blade disposed thereon in the form of a helix, means for rotating the shaft and a series of blades disposed on the shaft in planes at right angles to the axis thereof, substantially as and for the purpose set forth.

5. In milling apparatus for producing flour from grain and separating the germ, the combination of, a casing, means for forming the meal (including germ and flour) into flakes, and feeding them into the casing, and means for detaching the flour from the germ without breaking up the latter comprising a shaft, a conveying-blade disposed thereon in the form of a helix, means for rotating the shaft, an adjustable slide by means of which the number of blades brought into operation can be regulated and the degree of detaching the component parts of the flour flakes varied, and a second blade disposed on the shaft in a plane at right angles to the axis thereof, substantially as and for the purpose set forth.

6. In milling apparatus for producing flour from grain and separating the germ, the combination of, a casing, means for forming the meal (including germ and flour) into flakes and feeding them into the casing, and means for detaching the flour from the germ without breaking up the latter comprising a shaft, a conveying-blade disposed thereon in the form of a helix, means for rotating the shaft, an adjustable slide by means of which the number of blades brought into operation can be regulated and the degree of detaching the component parts of the flour flakes varied, and a series of blades disposed on the shaft in planes at right angles to the axis thereof, substantially as and for the purpose set forth.

7. In milling apparatus for producing flour from grain and separating the germ, the combination of, a casing, means for forming the meal (including germ and flour) into flakes and feeding them into the casing, and means for detaching the flour from the germ without breaking up the latter comprising a shaft, a conveying-blade disposed thereon in the form of a helix, means for rotating the shaft, and a plurality of sections of retarding-blades disposed on the shaft, substantially as and for the purpose set forth.

8. In milling apparatus for producing flour from grain and separating the germ, the combination of, a casing, means for forming the meal (including germ and flour) into flakes and feeding them into the casing, and means for detaching the flour from the germ without breaking up the latter comprising a shaft, conveying-blades disposed on the shaft, means for rotating the shaft, an adjustable slide by means of which the number of blades brought into operation can be regulated and the degree of detaching the component parts of the flour flakes varied, and a plurality of sections of retarding-blades disposed on the shaft, substantially as and for the purpose set forth.

9. In milling apparatus for producing flour from grain and separating the germ, the combination of, a casing, means for forming the meal (including germ and flour) into flakes, and feeding them into the casing, and means for detaching the flour from the germ without breaking up the latter comprising a shaft, a conveying-blade disposed thereon in the form of a helix, a second blade disposed on the shaft and forming a helix in the opposite direction to the aforesaid blade, and means for rotating the shaft, substantially as and for the purpose set forth.

10. In milling apparatus for producing flour from grain and separating the germ, the combination of, a casing, means for forming the meal (including germ and flour) into flakes and feeding them into the casing, and means for detaching the flour from the germ without breaking up the latter comprising a shaft, a conveying-blade disposed thereon in the form of a helix, a second blade disposed on the shaft and forming a helix in the opposite direction to the aforesaid blade, means for rotating the shaft, and an adjustable slide by means of which the number of blades brought into operation can be regulated and the degree of detaching the component parts of the flour flakes varied, subtantially as and for the purpose set forth.

11. In milling apparatus for producing flour from grain and separating the germ, the combination of a casing, means for forming the meal (including germ and flour) into flakes, and feeding them into the casing, and means for detaching the flour from the germ without breaking up the latter comprising a shaft, a conveying-blade disposed thereon in the form of a helix, a second blade disposed on the shaft and forming a helix in the opposite direction to the aforesaid blade, means for rotating the shaft, and a plurality of adjustable slides by means of which the degree of detaching the component parts of the flakes can be varied, substantially as and for the purpose set forth.

In witness whereof I have hereunto signed my name in the presence of two subscribing witnesses.

GEORGE HUDSON.

Witnesses:
EDMUND WARD PATTISON,
HERBERT HOWARD.